United States Patent Office 2,884,456
Patented Apr. 28, 1959

2,884,456
N-SUBSTITUTED-1-AMINOALKYL-3-ARYLINDENES AND INDANES

Kenneth N. Campbell, Evansville, Ind., assignor to Mead Johnson & Company, Evansville, Ind., a corporation of Indiana No Drawing. Application December 5, 1956
Serial No. 626,308

6 Claims. (Cl. 260—570.8)

This invention relates to new N-substituted arylindenes and arylindanes and more specifically relates to a class of compounds represented by the 1-dialkylaminoalkyl-3-arylindenes and indanes, the 1-dialkenylaminoalkyl-3-arylindenes and indanes, and the N-substituted-1-aminoalkyl-3-arylindenes and indanes in which latter the substituted nitrogen atom is a part of an N-heteromonocyclic ring. The acid addition and quaternary ammonium salts of these compounds are also contemplated as part of the present invention. These new compounds have the following structure:

(I) 
$$Z-\overset{R_3}{\underset{|}{C}}H-(CH_2)_n-Y$$

wherein $R_3$ is a radical selected from the group consisting of hydrogen and lower alkyl; Y is a disubstituted amino radical selected from the group consisting of —N-dialkylamino, —N-dialkenylamino, and a saturated —N-heteromonocyclic ring containing up to six ring atoms; $n$ is an integer from 1 to 2; and Z is a radical selected from the group consisting of

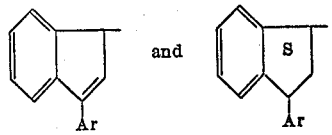

wherein Ar is an aryl radical selected from the group consisting of phenyl and substituted phenyl. Alternatively the Y group in structure I above may be designated as (II) 
$$-N\overset{R_1}{\underset{R_2}{\diagdown}}$$

wherein $R_1$ and $R_2$ are independently selected from the group consisting of lower alkyl, and lower alkenyl radicals and may further represent bivalent alkylene radicals wherein $R_1$ and $R_2$ are joined together and with the nitrogen atom form a heteromonocyclic ring which may be linked by a methylene group, an amino group, oxygen or sulfur. Thus the Y group in formula I may represent —N-dialkylamino, —N-dialkenylamino, and —N-heteromonocyclic amino radicals. As represented in structure II, the $R_1$ and $R_2$ radicals are preferably lower alkyl and alkenyl radicals and preferably contain up to 3 carbon atoms each, such as for example in dimethyl amino, di(iso)propyl amino, diallyl amino and the like. When $R_1$ and $R_2$ jointly form the heterocyclic ring structure, such ring preferably contains 5 or 6 ring atoms such as for example in the radicals —N-morpholino, —N-pyrrolidino, and —N-piperidino having the structures

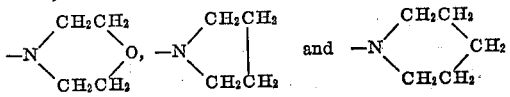

respectively.

The $R_3$ disclosed in structure I may, as aforesaid, be hydrogen or lower alkyl, containing up to about 3 or 4 carbon atoms, such as in methyl, ethyl, propyl or the like.

The substituent Ar in the 3-position of the indene or indane radicals may include a phenyl group or various substituted phenyl groups such as the para substituted phenyls. Exemplary of such substituted phenyl radicals are p-methoxyphenyl, p-chlorophenyl, p-dimethylaminophenyl, p-tolyl and the like.

The compounds of the present invention are useful as antispasmodic agents to control muscle spasms by antagonizing normal contractile states of intestinal, utereal, uterine and bronchial smooth muscle in animals and humans. These compounds may be administered orally in tablets, capsules, elixirs, syrups, or emulsions. A dosage of from 10 to 100 milligrams taken as indicated for the relief of muscle spasms is adequate for the average adult.

The compositions of the present invention may be prepared from the 3-arylindenes. These intermediates may be prepared by the reaction of the appropriate phenyl Grignard reagent with 1-indanone according to the general method of Mayer and Sieglitz Ber. 54, 1397 (1921). 1-indanone may be prepared by the polyphosphoric acid catalyzed ring closure of hydrocinnamic acid as described by Koo, J.A.C.S. 75, 1891 (1953). The 3-arylindenes are converted to the N-substituted-1-aminoalkyl-3-arylindene by treatment with sodamide, or equivalent, to form the sodium salt of the indene followed by reaction with an appropriate N-substituted aminoalkyl halide in accordance with the following equation.

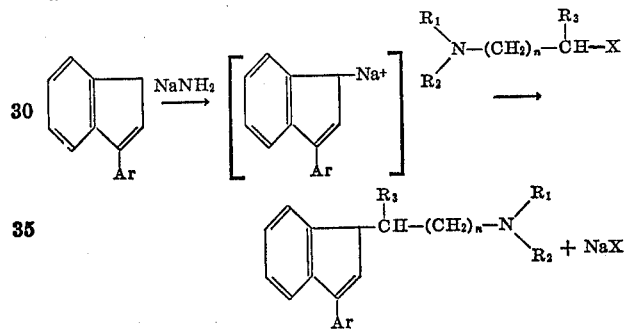

In the above equation the radicals identified as $R_1$, $R_2$ and $R_3$ are as disclosed above. X represents a halogen such as chlorine or bromine. It is preferred in this step of the synthesis to use approximately equimolar amounts of the sodamide, the tertiary aminoalkyl halide and the 3-arylindene since an excess of the first named reactant will result in appreciable formation of by-products and consequent reduction in yield. Of course, since sodamide is reactive with water, precautions to maintain substantially anhydrous conditions are required. The corresponding indane derivatives are prepared by hydrogenation of the indene compound. The hydrogenation may be carried out with conventional techniques using gaseous hydrogen under pressure and a catalyst such as palladium or platinum black or Raney nickel.

The following examples will illustrate the preparation of the compositions of the present invention.

PREPARATION OF THE 3-ARYLINDENES

The 3-arylindenes such as 3-phenylindene, 3-p-anisylindene, 3-p-chlorophenylindene and 3-p-dimethylaminophenylindene were prepared by the method essentially as disclosed by Mayer at al. supra, from the corresponding aryl Grignard reagent.

For example, 3-p-dimethylaminophenylindene may be prepared as follows: p-bromodimethylaniline (10 g., 0.05 mole) was added gradually to 1.5 grams of magnesium turnings in tetrahydrofuran; 1.1 grams of ethyl bromide was added at the beginning to initiate the reaction. The mixture was stirred and refluxed for one hour after all the halide had been added, and then 3 grams of 1-indanone (0.033 mole) in dry ether was added dropwise. The mixture was refluxed for one hour and was then poured onto ice and ammonium chloride. The organic layer was shaken with dilute hydrochloric acid, the acid extract was made basic, and the reaction product was extracted into ether. The ether layer was dried, the solvent evaporated and the residue distilled in vacuo to give 4.04 grams (74%) of 3-p-dimethylaminophenyl-indene, B.P. 178–180°/0.65 millimeter. The hydrochloride had M.P. 186–187° C. (dec.).

*Analysis.*—Calc'd for $C_{17}H_{18}ClN$: C, 75.12; H, 6.68; N, 5.15; Cl, 13.05. Found: C, 75.26; H, 6.65; N, 5.17; Cl, 12.82.

Physical properties and yields of the other 3-arylindenes prepared by the method of Mayer et al. are as shown in Table I.

TABLE I

| Aryl Group | Yield, percent | B.P., ° C./mm. Hg | M.P., ° C. (free base) |
|---|---|---|---|
| Phenyl | 72–87 | 118–125/0.4 | |
| p-Anisyl | 58–71 | 143–50/0.4 | 53–55 |
| p-Chlorophenyl | 66 | | 67–68 (dec.) |
| p-Dimethylaminophenyl | 74 | 178–180/0.65 | [1] 186–187 |

[1] Melting point of hydrochloride.

Instead of sodamide, it is possible to use sodium hydride, lithium amide or butyl lithium to form an alkali metal salt of the 3-arylindene suitable for reaction with a dialkylaminoalkyl halide. Since most dialkylaminoalkyl halides are available as their hydrohalide salts, it is possible to use these salts directly, by using two molar equivalents of sodamide, lithium amide, sodium hydride or butyl lithium. In this way isolation of the free base dialkylaminoalkyl halide can be avoided.

The 1-dialkylaminoalkyl-3-arylindenes listed in Table II were prepared in the manner described above. These compounds were, in general, rather viscous oils, and were characterized by boiling point, index of refraction, infrared spectra and analyses. Many of them were converted to solid hydrochlorides, but in some cases the hydrochlorides were hygroscopic oils which could not be crystallized. The compounds in Table II have the following structure:

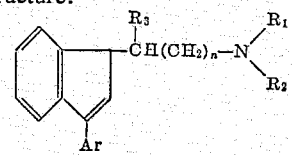

TABLE II

| Ar | n | R₁ | R₂ | R₃ | B.P., ° C./mm. Hg | $n_D^{20}$ | HCl salt, M.P., ° C. |
|---|---|---|---|---|---|---|---|
| C₆H₅ | 1 | CH₃ | CH₃ | H | 145–52°/0.25 | 1.5799 | 217–219° (dec.) |
| C₆H₅ | 1 | C₂H₅ | C₂H₅ | H | 145–8°/0.15 | 1.5744 | 156–158° (dec.) |
| C₆H₅ | 1 | —CH—CH=CH₂ | —CH—CH=CH₂ | H | 158–161°/0.3 | 1.5798 | |
| C₆H₅ | 1 | —CH₂·CH₂·O·CH₂·CH₂— | | H | 162–3°/0.5 | | 150–152° (dec.) |
| C₆H₅ | 1 | CH₃ | CH₃ | CH₃ | 145–55°/0.3 | 1.5816 | 215° (dec.) |
| C₆H₅ | 2 | CH₃ | CH₃ | H | 152–155°/0.6 | 1.5800 | |
| C₆H₅ | 2 | C₂H₅ | C₂H₅ | H | 155–160°/0.35 | 1.5687 | |
| p-Cl—C₆H₄ | 1 | CH₃ | CH₃ | H | 164–8°/0.85 | 1.5880 | |
| p-Cl—C₆H₄ | 2 | CH₃ | CH₃ | H | 178–84°/0.6 | 1.5833 | |
| p-CH₃O·C₆H₄ | 1 | CH₃ | CH₃ | H | 150–8°/0.15 | 1.5839 | |
| p-CH₃O·C₆H₄ | 1 | C₂H₅ | C₂H₅ | H | 175–85°/0.7 | 1.5729 | |
| p-CH₃O·C₆H₄ | 1 | CH₃ | CH₃ | CH₃ | 168–74°/0.4 | 1.5815 | |
| p-CH₃O·C₆H₄ | 2 | C₂H₅ | C₂H₅ | H | 178–81°/0.45 | 1.5770 | |
| p-(CH₃)₂NC₆H₄ | 1 | CH₃ | CH₃ | H | 190–8°/0.15 | 1.5948 | |

ALKYLATION OF 3-ARYLINDENES

*Example 1.—1-(3-dimethylaminopropyl)-3-phenylindene*

The following is an example of a process for preparing the substituted indenes of this invention: A mixture of 48 grams (0.25 mole) of 3-phenylindene and 9.4 grams (0.24 mole) of sodamide in 300 milliliters of anhydrous benzene was stirred and refluxed for 45 minutes. A solution of 24.3 grams (0.2 mole) of 3-dimethylaminopropyl chloride in 100 milliliters of dry benzene was added dropwise during one hour, and the mixture was then stirred and refluxed for twelve hours. The reaction mixture was poured onto crushed ice, the benzene layer separated and the aqueous layer extracted with ether. The combined benzene and ether solutions were dried over magnesium sulfate, the solvents removed under reduced pressure and the residue distilled in vacuo. There was obtained 19.4 grams (35%) of 1-(3-dimethylaminopropyl)-3-phenylindene, B.P. 157–164° C./0.4 mm. Hg.

*Example 2.—1-(2-dimethylaminoethyl)-3-phenylindane*

The following is an example of a process of preparing the substituted indanes of this invention from the corresponding substituted indenes: a solution of 7 grams (0.027 mole) of 1-(2-dimethylaminoethyl)-3-phenylindene in 100 milliliters of 95% ethanol containing about 400 milligrams of Baker's 10% palladium-on-carbon catalyst was shaken with hydrogen at an initial pressure of 60 p.s.i. and room temperature until absorption of hydrogen ceased (3–4 hours). The catalyst was removed by filtration and the filtrate was evaporated under reduced pressure to remove the ethanol. The residue was taken up in ether, washed with water, dried over magnesium sulfate and distilled. There was obtained 4.1 grams (64%) of 1-(2-dimethylaminoethyl)-3-phenylindane, B.P. 138–44°/0.5 millimeter; $n_D^{20}$ 1.5714.

Physical properties of other 1-dialkylaminoalkyl-3-arylindanes prepared as above are shown in Table III. These compounds have the structure:

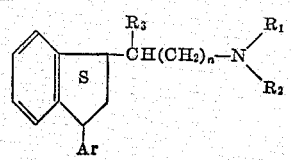

TABLE III

| Ar | n | R₁ | R₂ | R₃ | B.P., ° C./mm. Hg | $n_D^{20}$ | HCl, M.P., ° C. |
|---|---|---|---|---|---|---|---|
| C₆H₅ | 1 | CH₃ | CH₃ | H | 138–44°/0.5 | 1.5714 | 159–163° (dec.) |
| C₆H₅ | 1 | CH₃ | CH₃ | CH₃ | 153–8°/0.7 | | 116–120° (dec.) |
| C₆H₅ | 1 | C₂H₅ | C₂H₅ | H | 142–3°/0.65 | 1.5595 | |
| C₆H₅ | 2 | C₂H₅ | C₂H₅ | H | 143–7°/0.1 | 1.5515 | 115–117° (dec.) |
| p-CH₃O·C₆H₄ | 1 | CH₃ | CH₃ | H | 160–6°/0.3 | 1.5678 | |
| p-CH₃O·C₆H₄ | 2 | C₂H₅ | C₂H₅ | H | 171–8°/0.6 | 1.5538 | |

As previously pointed out, these compounds may be administered as the free base or as the nontoxic acid addition or quaternary ammonium salts. Examples of suitable nontoxic acid addition salts are hydrochlorides, hydrobromides, hydroiodides, sulfates, phosphates, acetates, citrates, succinates, tartrates and the like. Suitable quaternary ammonium salts are those that may be obtained by the addition of the nontoxic basic ester of alkyl or aralkyl esters of inorganic acids or organic sulfonic acids, the foregoing including such compounds as methyl chloride, methyl bromide, methyl iodide, ethyl bromide, propyl chloride, benzyl chloride, benzyl bromide, methyl sulfate, methyl benzene sulfonate, methyl paratoluene sulfonate and the like.

While several particular embodiments of this invention are shown above, it will be understood of course that the invention is not to be limited thereto, since many modifications may be made, and it is contemplated therefore, by the appended claims, to cover any such modifications as fall within the true spirit and scope of this invention.

I claim:

1. A compound of the structure

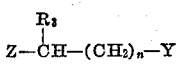

wherein $R_3$ is a radical selected from the group consisting of hydrogen and lower alkyl, Y is a disubstituted amino radical selected from the group consisting of —N-dialkylamino, —N-dialkenylamino, —N-morpholino, —N-pyrrolidino and —N-piperidino radicals, $n$ is an integer of from 1 to 2, said Y group containing not more than 6 carbon atoms, and Z is a radical selected from the group consisting of

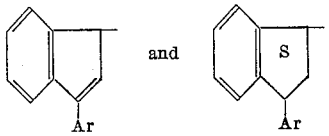

wherein Ar is an aryl radical selected from the group consisting of phenyl, chlorophenyl, methoxyphenyl, dimethylamino phenyl and tolyl.

2. 1-(2-dimethylaminoethyl)-3-phenylindene.
3. 1-(2-dimethylaminoethyl)-3-p-anisylindene.
4. 1-(2-dimethylaminoethyl)-3-phenylindane.
5. 1-(2-diethylaminoethyl)-3-phenylindane.
6. 1-(3-diethylaminopropyl)-3-phenylindane.

References Cited in the file of this patent

Eisleb: Ber. 74B, pages 1433–50 (1941), abstracted from Chem. Abst., vol. 36, page 5466.

Hoffman et al.: Helv. Chim. Acta, vol. 27, pp. 1782–90 (1944), abstracted from Chem. Abst., vol. 40, page 1487.